Patented Mar. 17, 1953

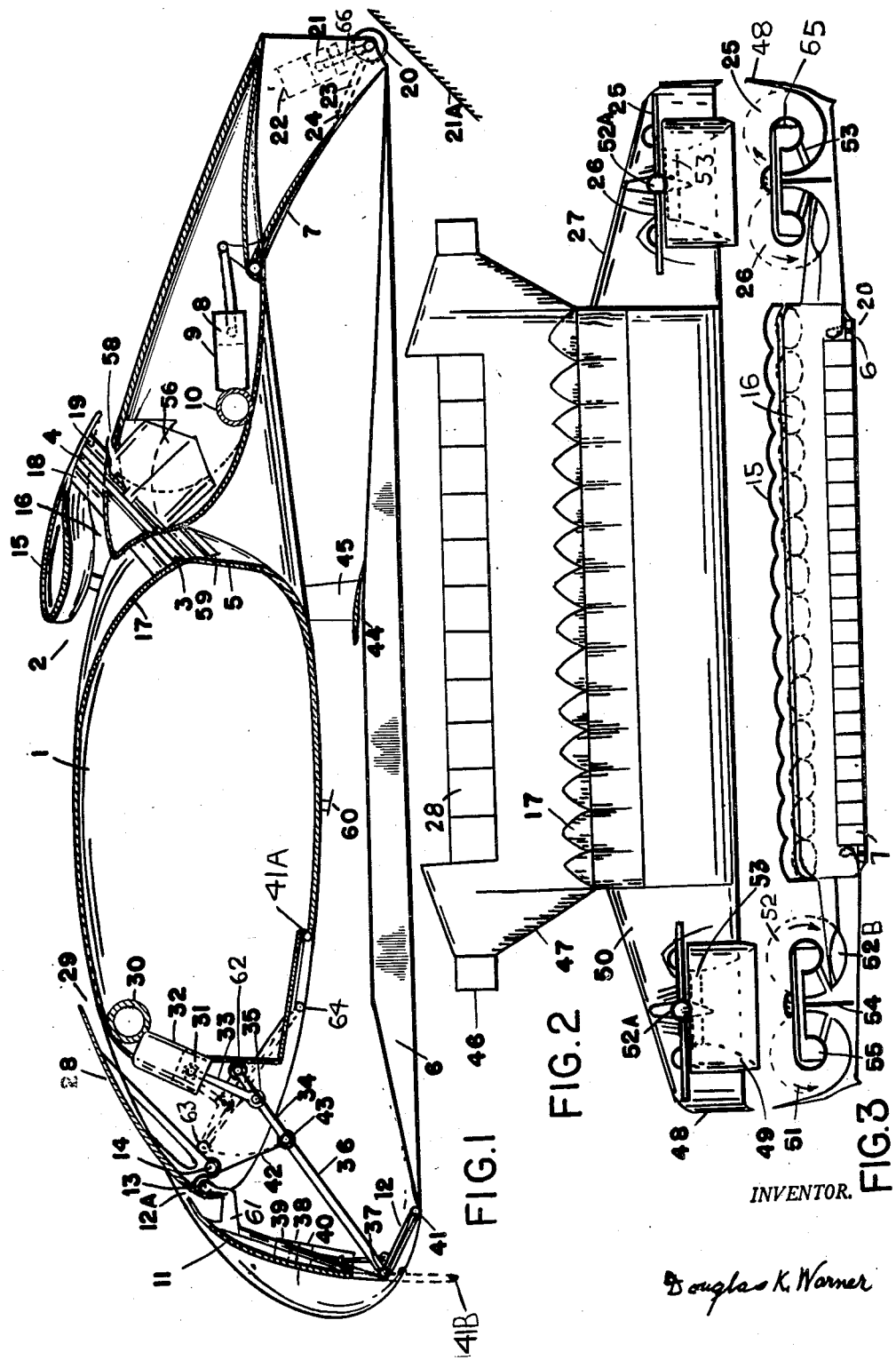

2,631,794

UNITED STATES PATENT OFFICE 2,631,794

AIRFOIL NOSE FLAP ARRANGEMENT

Douglas K. Warner, Sarasota, Fla.

Application July 22, 1947, Serial No. 762,631

2 Claims. (Cl. 244—42)

The object of this invention is to provide an aircraft with additional lift while moving slowly. It has for its chief object the provision of improvements in the design and construction of aircraft as a result of which aircraft of high performance and efficiency may be constructed.

The invention is more particularly applicable to aircraft which are intended to be supported, particularly during take off and landing by air pressure developed in a space between the undersurface of the aircraft and a ground or water surface. Aircraft of this type are described in the specifications of my prior Patents Nos. 2,559,036 and 2,462,578. The present invention is not, however, limited to such aircraft but is applicable in many of its aspects to aircraft of other kinds.

This invention is directed to the lower and upper surface of the leading edge of an airfoil body. These surfaces when pivoted along with a trailing edge flap permit trapping the air compressed between said body and a land or water surface. The compressed air must move forwardly beneath the body and escape rearwardly over the top surface thereof at a slot formed over the leading edge by a forwardly pivoted front lower flap and from a slot formed beneath an upwardly pivoted front upper flap. The air thus escaping at high velocity rearwardly over the top surface gives that top surface a high suction lift before the plane starts to move and also an efficient reaction thrust. Likewise, when landing, while giving the wing a high drag to slow it down these flaps also create a pressure beneath a wing at high attack angle and a high velocity over the top of the wing which prevents the usual stall conditions and permits a slow landing.

In the drawing Figure 1 is a sectional side view of plane's center portion.

Fig. 2 is a top view of plane and Fig. 3 a rear view of it.

In Fig. 1 air is sucked in from over the top surface of 1 thru depression passage 2 between member 1 and an upper structure 15 which forms cowlings over the upper fan blades 4 and a diffusing passage entrance to both upper fan blades 4 and lower blades 3. Air is forced by lower blades 3 into diffuser 5 whence it is released under pressure beneath the airfoil member 1. The runners 6 at lateral edges of member 1 prevent air escape laterally and rear flap 7 when depressed to ground prevents air escape rearwardly, flap 7 is depressed by piston 8 in cylinder 9 which is fed with air under pressure from cylinder 10.

The front flap 11 being pivoted forwardly has a hinged flap 12 at its lower extremity which drags over the land or water surface, its edge portions moving in approximate contact with the inner walls of the forwardly extended portion of runners 6 these inner walls being vertical at this location. Air escapes over the leading edge at slot 12A in a rearward direction at high velocity giving a suction lift. The flap 11 is attached by crooked arm 61 to pivot pin 13 this being located forwardly and upwardly of the center of curvature of the leading edge 14 in such a manner as to cause the forward edge of the flap 1 forming the bottom surface of the airfoil to sweep in front of and above the leading edge of airfoil member 1 when said flap is swung forwardly on pivot 13. The curvature of the bottom surface of the airfoil is such that when it is in the forward position with the plane moving ahead air from in front of the plane will sweep over that edge at high velocity supplementing the very high velocity jet leaving slot 12A from the high pressure region beneath the plane.

The air sweeping back over the top surface of 1 now again enters diffusing passage 2 in part moving down over the semicircular depressions 17 to the lower fan blades 3, part moving thru channel 16 past the air straightening baffle 18 to fan blades 4 in the upper part of fan disk and past stationary vanes 19 and out at high velocity over the trailing edge of airfoil 1, the passage 16 being contracted continually rearwardly to get this high velocity jet over the rear surface of the wing and so change the usual downward air pressure at 80% of chord into a high suction lift. The air passage in which the lower fan blades 3 operate is, on the contrary, continually expanded both before and after the blades so that the air leaves below the plane at high pressure and reduced velocity. The velocity of air reaching the fan blades is much less than that entering passage at 2 so that the blade tips do not operate with sonic air speed.

This plane makes its landing approach at about a 45° attack angle since it can not be stalled with all the air movement over the top surface mentioned. The high attack angle gives enormous drag and lift with the fan blades at top speed. This gives the plane somewhat the characteristics of the helicopter while still permitting the highest top speed. The rear runner wheels 20 are mounted at the rear lower end of arm 23 which is pivoted at 24 and these wheels also have their axis attached to connecting rod 66 which is pivoted at its opposite end in piston 21 so that air pressure applied in cylinder 22 against piston 21 forces the wheels 20 down before landing and permits them to bounce back to absorb the shock of contact. The instant contact is made the plane will pivot down around wheel 20 and land on the air compressed beneath the airfoil member 1 during that rapid pivoting motion and it will then skim over the surface as it does during takeoff as long as the engines are kept in motion to supply the compressed air. When the engines are cut, either over water or land, the plane will drag on runners 6 to a quick stop. It is preferable to stop in shallow water and then gun the engines so as to jump up on shore with little forward velocity and thus save replacing runner-edge wear-plates. The landing skim is shortened by raising rear flap 7 and so permitting rapid escape of air while engines are running. As shown in Figures 2 and 3, rear lateral wings 27 and 50 are swept back and tapered and their tip portions 48 curved upwardly around the orbit of propellers 25 and 51. These propellers are driven by engines mounted in nacelles 65 and 55 which hang below the outer tips of airfoils 49 which airfoils are supported above lateral wings 27 and 50 by housings 54 which are built up around the lower orbits of propellers 25, 26, 51 and 52, the inboard propellers 26 and 52 being driven by engines mounted in nacelles hung below the inboard tips of upper airfoils 49. Short chord airfoils 53 connect nacelles with lower portion of housings 54 and are set a high attack angle so as to form a diffuser in conjunction with and below airfoil 49. All propellers sweep upwardly before this upper wing and the diffuser, and create a pressure lift beneath 49 as well as giving it Katzmaier alternating flow action each time a propeller blade moves the air upwardly in front of the wing after the normal rearward airflow. These propellers situated over mid-chord of wings 27 and 50 give a high suction lift to those wings for a considerable distance both fore and aft of the propellers, the velocity and lift behind the propellers exceeding that ahead of them. The throttles of the engines driving these propellers are used to simultaneously bank and turn the plane. A higher speed of the port engines lifts the port wing and pulls it around faster than the starboard wing.

The slot 12A is open as soon as flap 11 is lowered for starting and all the air blown by fans is released at this opening, but as the plane speeds up the fans handle more air and the slot 28 is now pivoted upwardly about pivot 14 at the center of leading edge curvature and thus opening new slot 29 in the upper surface and so further increasing the lift on the upper surface by a new airflow starting at about 17% of chord from leading edge. This slot is opened also when the plane is about to land after the compressed air in pipe 30 has depressed piston 31 in cylinder 32 and has acted on connecting rod 33 which is pivoted at one end in piston 31 and at the other end in arm 34 at pin 35 midway from fulcrum 62 to arm elbow 43. This shoves elbow 43 from its normal position shown dotted at 63 to a nearly straight line position with arm 36, the wire 42 preventing a straight line position. Arm 36 is pivoted in 34 at 43, and in the lower edge of front flap 11 at 37, and with pivot 13 holds flap 11 in rigid forward position except if it is knocked back by an exceptionally high wave. The lower flap 12 might press unnecessarily hard on the surface below with its tip roller 41 due to the air pressure acting on it from the space beneath member 1, accordingly, the double acting piston 38 is forced, by the air acting in lower cylinder end 40, upwardly to relieve some of the pressure acting on 12 but in a wave trough 41 swings down to dotted position 41b under the force of the air pressure in chamber under 1 but when flap 11 is being retracted to its position forming the under surface of the forward part of airfoil 1 air pressure is turned on above piston 38 at 39 to position the flap 12 for its place in the airfoil member 1, 41 moving to 41a and 37 to 64.

An airfoil 44 is spaced beneath member 1 and at positive attack angle forwardly of exit of diffusing air passage 5 thru the wing 1. It is supported at intervals across the span by braces 45 and is anchored in both runners 6.

This airfoil 44 forms a diffuser below 1 thus increasing the pressure sharply before reaching the high pressure air emerging from passage 5. The plane is somewhat similar to that shown in Patent 2,559,036, having front aileron-elevators 46 pivoted at quarter-chord point in the tips of front stabilizers 47.

The front stabilizers are so short and highly tapered that they do not stall before the plane has reached an angle of more than 45 degrees but the aileron tips must be tilted down when at this high attack angle so that they do not stall.

Gun turrets are shown 52A positioned between each pair of rear propellers to give wide sweep of all points except those in the propeller line.

Recent Langley Field tow basin tests of a 1939 model showed that the C. P. is apt to move rearwardly as the plane gains speed and the retarded opening of slot 29 tends to offset that rearward movement if that slot is gradually increased as speed increases.

Numeral 56 indicates position of engines to drive fan blades 3 and 4, and 57 the diffuser taking air from fan to engine and 58 the slot thru which exhaust from engine and cooling air are jetted over the top surface of 1 at its rear portion.

Front upper flaps 28 and rear flap 7 are preferably divided in many sections as shown in Figs. 2 and 3.

It will be seen that the elimination of landing gear and floats and the ability of the plane runners 6 to safely cut thru wave tops at high speeds and a center of lift more than twice the usual distance rearward of the leading edge, so that the plane cannot dive into the water, as do other planes with their center of gravity high and forwardly placed, permits us now to fly continuously, safely, close to the water with ten times the wing loading possible with planes which must take off at one third the speed which is safe for this plane. With ten times the loading we may have 100 times the wing area and 1,000 times the gross load all conditions being the same but if we fly close to the waves the induced drag is but 1% as high so we can fly ten times the loading with no additional power above that required away from ground effect and since we have none of the reversing spar stresses caused by changing from support on outstretched wings to central landing gear and have only always an air pressure beneath every square foot of wing surface equal to the load above that surface the frame of the plane can be much lighter and the size of the plane be much more than 1,000 times greater than that of any other plane. Keeping the CP forward while skimming is a most important object of this invention in which a lower front flap and an upper front slat combine to produce forwardly located lifts by the high velocity air jets they produce near the leading edge of the plane.

I claim in an airplane:

1. In an aircraft a sustaining airfoil comprising a main airfoil body having an arcuate leading edge of large radius, a flap, pivot means connecting said flap to said body whereby said flap is movable between retracted and projected positions, said pivot means being arranged to provide pivot axis forward and upwardly of the center of curvature of said leading edge, said flap when in the retracted position extending rearwardly from said leading edge and forming the forward portion of the undersurface of the airfoil, said flap when in the projected position being spaced forwardly from the leading edge and with a major portion thereof extending downwardly from before said leading edge and a minor portion extending upwardly and rearwardly above said leading edge whereby to form an upwardly rearwardly converging slot between said flap and the upper portion of said body whereby to enable a flow of air rearwardly from space below said body over the top surface of said body when said flap is in the projected position.

2. The structure of claim 1 and including a passageway through said body near its leading edge, said passageway terminating at the upper and lower surfaces of said body, said flap when in the retracted position closing the lower end of said passageway, a slat, and pivot means connecting said slat to said body whereby said slat is movable between retracted and projected positions, said last named pivot means for said slat being arranged to provide a pivot at the center of curvature of said leading edge, said slat when in retracted position closing the upper end of said passageway and extending rearwardly from said leading edge to form the forward portion of the upper surface of the airfoil, said slat when in the projected position diverging upwardly and rearwardly from the leading edge of said body with its trailing edge above the start of the remaining top surface of said body, whereby when said flap and slat are in their projected positions air may flow upwardly through said passageway and rearwardly between said slat and said body and above the upper surface of said body and whereby when in their projected positions said flap and slat produce high velocity air currents of high lifting power above the top surfaces of said slat and said body and a high pressure beneath them.

DOUGLAS K. WARNER.

REFERENCES CITED

The following references are of record in the file of this patent:

UNITED STATES PATENTS

| Number | Name | Date |
| --- | --- | --- |
| 1,003,364 | Langston | Sept. 12, 1911 |
| 1,819,216 | Warner | Aug. 18, 1931 |
| 1,855,076 | Warner | Apr. 19, 1932 |
| 1,868,832 | Henter et al. | July 26, 1932 |
| 1,880,019 | Harper | Sept. 27, 1932 |
| 1,880,967 | Maxwell | Oct. 4, 1932 |
| 1,986,064 | Leray | Jan. 1, 1935 |
| 2,241,521 | Richard | May 13, 1941 |
| 2,390,859 | Warner | Dec. 11, 1945 |
| 2,427,972 | Melchior | Sept. 23, 1947 |

FOREIGN PATENTS

| Number | Country | Date |
| --- | --- | --- |
| 488,942 | Great Britain | July 18, 1939 |
| 586,496 | Germany | Oct. 21, 1933 |